(12) United States Patent
Beauchamp

(10) Patent No.: US 9,910,431 B1
(45) Date of Patent: Mar. 6, 2018

(54) SYSTEM AND METHOD FOR AGGREGATE CONTROL OF A REMOTE CONTROL VEHICLE

(71) Applicant: Christopher Beauchamp, Orlando, FL (US)

(72) Inventor: Christopher Beauchamp, Orlando, FL (US)

( * ) Notice: Subject to any disclaimer, the term of this patent is extended or adjusted under 35 U.S.C. 154(b) by 36 days.

(21) Appl. No.: 15/074,406

(22) Filed: Mar. 18, 2016

Related U.S. Application Data

(60) Provisional application No. 62/134,934, filed on Mar. 18, 2015.

(51) Int. Cl.
*G05D 1/00* (2006.01)

(52) U.S. Cl.
CPC .................... *G05D 1/0011* (2013.01)

(58) Field of Classification Search
USPC ............ 701/2, 4; 244/30; 340/12.22; 725/24
See application file for complete search history.

(56) References Cited

U.S. PATENT DOCUMENTS

| | | | |
|---|---|---|---|
| 4,799,914 A | 1/1989 | Hutchinson | |
| 4,931,028 A * | 6/1990 | Jaeger | A63H 27/10 244/30 |
| 6,247,994 B1 * | 6/2001 | DeAngelis | A63H 33/00 446/454 |
| 2004/0210923 A1 * | 10/2004 | Hudgeons | G06Q 30/02 725/24 |
| 2005/0073497 A1 * | 4/2005 | Kim | G01S 19/14 345/158 |
| 2010/0023338 A1 * | 1/2010 | Petronelli | G06Q 30/02 705/1.1 |
| 2010/0138874 A1 | 6/2010 | Deutschman | |
| 2010/0315262 A1 * | 12/2010 | Coombs | G08C 17/00 340/12.22 |
| 2011/0225040 A1 * | 9/2011 | Yerli | G06Q 30/02 705/14.49 |
| 2011/0313596 A1 * | 12/2011 | Ecton | B61L 3/127 701/2 |
| 2014/0179432 A1 * | 6/2014 | Cohen | A63H 3/28 463/31 |
| 2015/0346721 A1 * | 12/2015 | Werner | G05D 1/0016 701/2 |
| 2016/0018821 A1 * | 1/2016 | Akita | B60W 30/00 701/2 |
| 2016/0116912 A1 * | 4/2016 | Nehmadi | G05D 1/0022 701/2 |
| 2016/0375983 A1 * | 12/2016 | Yan | B64C 17/02 701/4 |

OTHER PUBLICATIONS

PCT International Searching Authority: International Search Report and Written Opinion dated Jan. 30, 2017; entire document.

* cited by examiner

*Primary Examiner* — Jonathan M Dager
*Assistant Examiner* — Richard A Goldman
(74) *Attorney, Agent, or Firm* — Allen Dyer Doppelt & Gilchrist

(57) ABSTRACT

A system for aggregate control of a remote control vehicle includes an aggregation and control server configured to receive user direction inputs from a plurality of electronic devices associated with spectators at an entertainment venue. Based on the user direction inputs and information and program instructions in data storage, the aggregation and control server generates control outputs communicated to the remote control vehicle via a remote control transmitter.

23 Claims, 2 Drawing Sheets

SYSTEM AND METHOD FOR AGGREGATE CONTROL OF A REMOTE CONTROL VEHICLE

CROSS-REFERENCE TO RELATED APPLICATION

This application claims the benefit of U.S. Provisional Patent Application Ser. No. 62/134,934, filed on Mar. 18, 2015, the contents of which are herein incorporated by reference in their entirety.

FIELD OF THE INVENTION

The present invention relates to remote control vehicles, and more particularly, to the employment of remote control vehicles in public entertainment venues.

BACKGROUND OF THE INVENTION

It is known to employ remote control vehicles at entertainment venues such as sports arenas, stadiums, concert venues, fairgrounds and the like. For example, remote control blimps will be flown over spectators during lulls in the action of sporting events or concerts to entertain the spectators. To heighten interest, the blimp may even be configured to drop promotional items like T-shirts. While the use of such remote control vehicles can be a crowd pleaser, further improvements are possible.

SUMMARY OF THE INVENTION

In view of the foregoing, it is an object of the present invention to provide a system and method for aggregate control of a remote control vehicle, allowing a plurality of electronic inputs from spectators at an entertainment venue to be used to direct the movement of a remote control vehicle.

These and other objects, aspects and advantages of the present invention will be better appreciated in view of the drawings and following description of preferred embodiments.

DETAILED DESCRIPTION OF PREFERRED EMBODIMENTS

Figure 1:
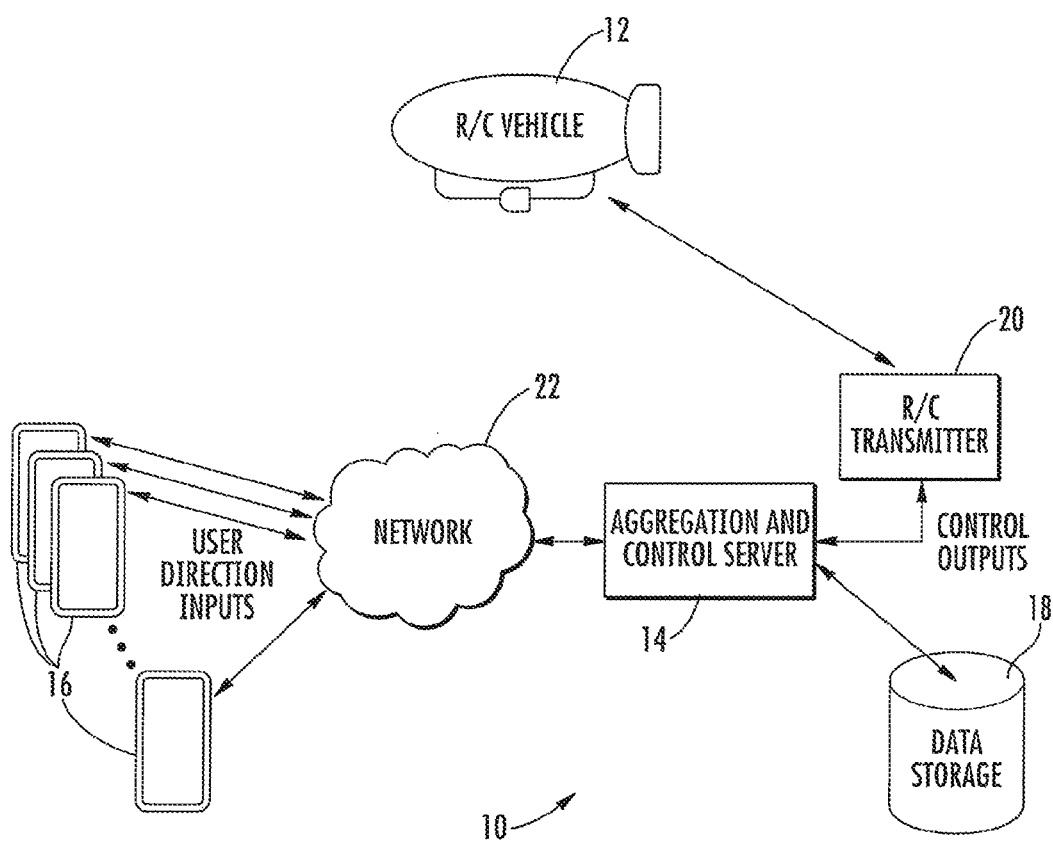
FIG. 1 is a schematic overview a system for aggregate control of a remote control vehicle, according to an embodiment of the present invention.
Figure 2:
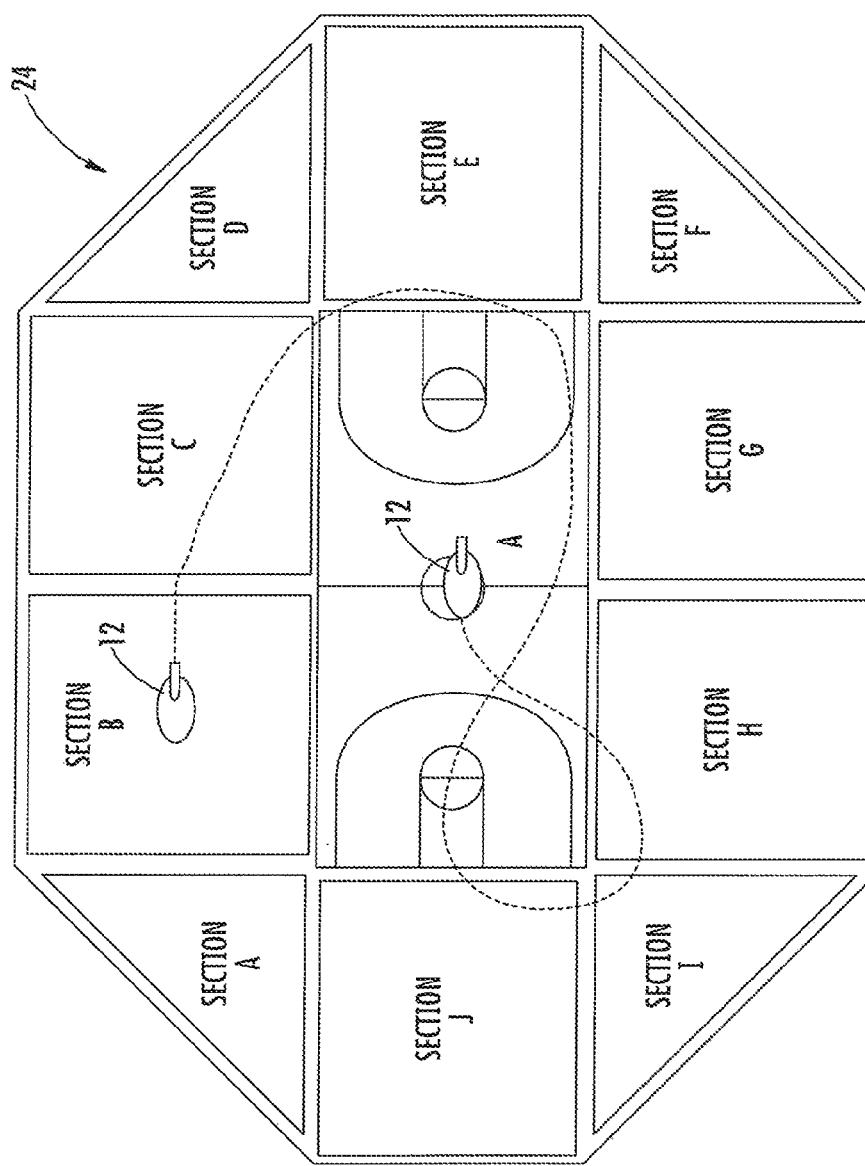
FIG. 2 is a schematic depiction of a remote control vehicle controlled by the system of FIG. 1.

Referring to FIG. 1, a system 10 for aggregate control of a remote control vehicle 12 includes an aggregation and control server 14 configured to receive user direction inputs from a plurality of electronic devices 16 associated with spectators at an entertainment venue. Based on the user direction inputs and information and program instructions in data storage 18, the aggregation and control server 14 generates control outputs communicated to the remote control vehicle 12 via a remote control (R/C) transmitter 20.

Although a remote control blimp represents a particularly advantageous embodiment due the combination of mobility and safety offered by such a vehicle, any remote control vehicle 12 could be used in connection with the present invention, including fixed and rotary wing aircraft, cars, boats, trains, etc. Preferably, the vehicle 12 is equipped to receive wireless transmissions, in which case the transmitter 20 would be a wireless transmitter, but corded remote control vehicles could also be employed. The remote control vehicle 12 can be equipped with a global positioning system (GPS) receiver to be able to transmit its position back to the server 14, or other position inputs onboard or independent of the vehicle 12 could be used to determine position.

The aggregation and control server 14 is a computer device, including at least one hardware processor configured to execute program instructions, but is not limited to any particular type, number or configuration of processors or other hardware or software components, or other physical configuration elements, nor to a particular programming language, network communication protocol, or the like. Likewise, the data storage 18 is tangible, non-transitory memory storage, but not otherwise limited to a particular memory storage media or data format, or number or configuration of storage devices. The server 14 and data storage 18 could be located within a common housing, or components of each or both could be distributed in different locations while maintaining data communication therebetween. Likewise, the transmitter 20 could be incorporated into a common housing, with either or both server 14 or data storage 18, or remotely connected thereto via wired or wireless connection.

In a preferred embodiment, the electronic devices 16 from which the user direction inputs are received are personal electronic devices, such as smart phones and tablet computers, and the inputs are communicated via one or more wireless networks 22 to the aggregation and control server 14. In one example, user direction inputs could be sent via text message over various wireless carriers' networks associated with the individual spectators' devices. In another example, user direction inputs could be received more directly over a local wireless network at the venue. In a more extreme example, the electronic devices could be something as simple as buttons associated with seats at the venue pressed by spectators to generate the direction inputs.

In one advantageous implementation of the system 10, a sports arena 24 has a plurality of seating sections (A-J), in each of which a plurality of spectators are seated. At some point during a game, a remote control vehicle 12 is released at a starting point (A) and the spectators are prompted to text their seat number to a recipient identifier (such as a phone number) associated with the aggregation and control server 14. The server 14 has available to it current position of the vehicle 12 relative to a map of the arena (from data storage 18), or can generate this information via a controlled circuit made by the vehicle 12. The server 14 can further identify which section is associated with a given seat number from data in data storage 18, and periodically and iteratively aggregates how many responses are received from each section.

Via control outputs to the transmitter 20, the server will drive the vehicle 12 toward the section currently returning the greatest number of responses. After a predetermined period of time, the vehicle 12 will finish (B) at the section generating the largest number of responses within that time. The vehicle 12 could also drop promotional items or display a message to spectators within the winning section. Alternately, spectators could be given some reward (e.g., a free food or drink item). Reward information could be transmitted back to the electronic devices 16 of the spectators; for example a text with a coupon or link could be sent. Phone numbers or other identifying data on the spectators, determined via communication with the devices 16, could be stored in the data storage 18 for this and other purposes. Pictures of the winning section/spectator(s) could be taken by the vehicle 12 and transmitted to the server 14 for display on a scoreboard or other display in the venue.

In the above described example, the aggregation and control server 14 simply steers the vehicle 12 toward the section generating the most responses as this is iteratively determined, but other aggregate response-based control routines could be employed. For example, specific directional commands, such as "left" and "right" could be solicited from spectators, with the direction and magnitude of course changes being dictated by the aggregated responses. As another example, the vehicle 12 could also be directed to follow a predetermined or randomly generated course—for instance, circling the arena 24—until the time window for receiving responses closes. At that time, the vehicle 12 would be directed to the winning section.

Directions could also be referenced toward individual spectators or other locations associated with groups of spectators. Spectators could be permitted to respond more than once, or the server 14 could automatically disregard subsequent responses from the same spectator. Instead of generating control outputs based on total response numbers, other metrics could be used—such as percentage of spectators within a section responding. Quiz questions could be asked in connection with the solicitation of user direction inputs, with only responses including correct answers being aggregated to generate control outputs.

Rather than requiring spectators to include seat numbers, the server 14 could use other means to determine spectator location. For example, spectators could submit names or numbers that are cross-referenced with stored data to determine seat locations. In other examples, electronic devices 16 internally-generated position data could also be received, or device 16 positions could be triangulated by sensors associated with the server 14.

From the foregoing, it will be appreciated that the present invention greatly enhances the interest and involvement of spectators in the operation of remote control vehicles, making the spectators active parties in the guidance of such vehicles. However, the foregoing is provided for illustrative and exemplary purposes; the present invention is not necessarily limited thereto. Rather, those skilled in the art will appreciated that various modifications, as well as adaptations to particular circumstances, are possible within the scope of the invention as herein shown and described.

What is claimed is:

1. A remote control vehicle and control system comprising:
    a remote communications device configured to transmit control outputs;
    a remote control vehicle configured to receive the control outputs from the remote communications device and to move in response thereto; and
    an aggregation and control server having at least one processor and non-transitory memory, and configured with program instructions to:
        receive a plurality of user direction inputs from a plurality of electronic devices over a network;
        generate the control outputs based upon an aggregation of the plurality of user direction inputs; and
        transmit the control outputs to the remote control vehicle via the remote communications device;
    wherein the user direction inputs received by the aggregation and control server include user locations; and
    wherein the aggregation and control server correlates user locations to sections of a venue.

2. The remote control vehicle and control system of claim 1, wherein the remote control vehicle is at least one of: a blimp, a fixed wing aircraft, a rotary wing aircraft, a car, a boat and a train.

3. The remote control vehicle and control system of claim 2, wherein the remote control vehicle is a blimp.

4. The remote control vehicle and control system of claim 1, wherein the remote control vehicle is equipped with a global positioning system (GPS) receiver to determine a remote control vehicle position.

5. The remote control vehicle and control system of claim 4, wherein the remote control vehicle is configured to transmit the remote control vehicle position to the aggregation and control server.

6. The remote control vehicle and control system of claim 1, wherein the user direction inputs received by the aggregation and control server include user seat identifiers.

7. The remote control vehicle and control system of claim 6, wherein the aggregation and control server is configured to access a map of a venue and correlate the user seat locations to sections thereof.

8. The remote control vehicle and control system of claim 1, wherein the user direction inputs include user information used by the aggregation and control server to determine user seat identifiers.

9. The remote control vehicle and control system of claim 8, wherein the user information includes at least one of names and phone numbers.

10. The remote control vehicle and control system of claim 1, wherein the aggregation and control server is configured to triangulate positions of the plurality of electronic devices.

11. The remote control vehicle and control system of claim 1, wherein the aggregation and control server periodically aggregates a total number of user direction inputs from each of the sections.

12. The remote control vehicle and control system of claim 11, wherein the aggregation and control server generates the control outputs to direct the remote control vehicle toward at least one of the sections returning the greatest number of user direction inputs.

13. The remote control vehicle and control system of claim 11, wherein after a predetermined time, the aggregation and control server generates the control outputs to direct the remote control vehicle to finish at one of the sections returning the greatest number of user direction inputs.

14. The remote control vehicle and control system of claim 11, wherein the aggregation and control server generates the control outputs to direct the remote control vehicle to display a message to at least one of the sections returning the greatest number of user direction inputs.

15. The remote control vehicle and control system of claim 11, wherein the aggregation and control server generates the control outputs to direct the remote control vehicle to deliver at least one promotional item to at least one of the sections returning the greatest number of user direction inputs.

16. The remote control vehicle and control system of claim 11, wherein the aggregation and control server generates the control outputs to direct the remote control vehicle to take a picture of at least one of the sections returning the greatest number of user direction inputs.

17. The remote control vehicle and control system of claim 16, further comprising:
    a display in the venue;

wherein the aggregation and control server is further configured to transmit the picture of the one of the sections to the display.

18. The remote control vehicle and control system of claim 11, wherein the aggregation and control server is further configured to transmit reward information back to a portion of the plurality of electronic devices located in a one of the sections returning the greatest number of user direction inputs.

19. The remote control vehicle and control system of claim 1, the user direction inputs received by the aggregation and control server include specific directional commands.

20. The remote control vehicle and control system of claim 19, wherein the aggregation and control server is further configured to generate the control outputs such that a direction and magnitude of course changes of the remote control vehicle is dictated by an aggregation of the specific directional commands.

21. The remote control vehicle and control system of claim 1, the user direction inputs received by the aggregation and control server include answers to quiz questions, the aggregation and control server being configured to only use user direction inputs with correct answers to generate the control outputs.

22. The remote control vehicle and control system of claim 1, wherein the remote control vehicle is equipped to receive wireless transmissions.

23. The remote control vehicle and control system of claim 1, wherein the remote control vehicle is corded.

* * * * *